United States Patent Office 3,258,433
Patented June 28, 1966

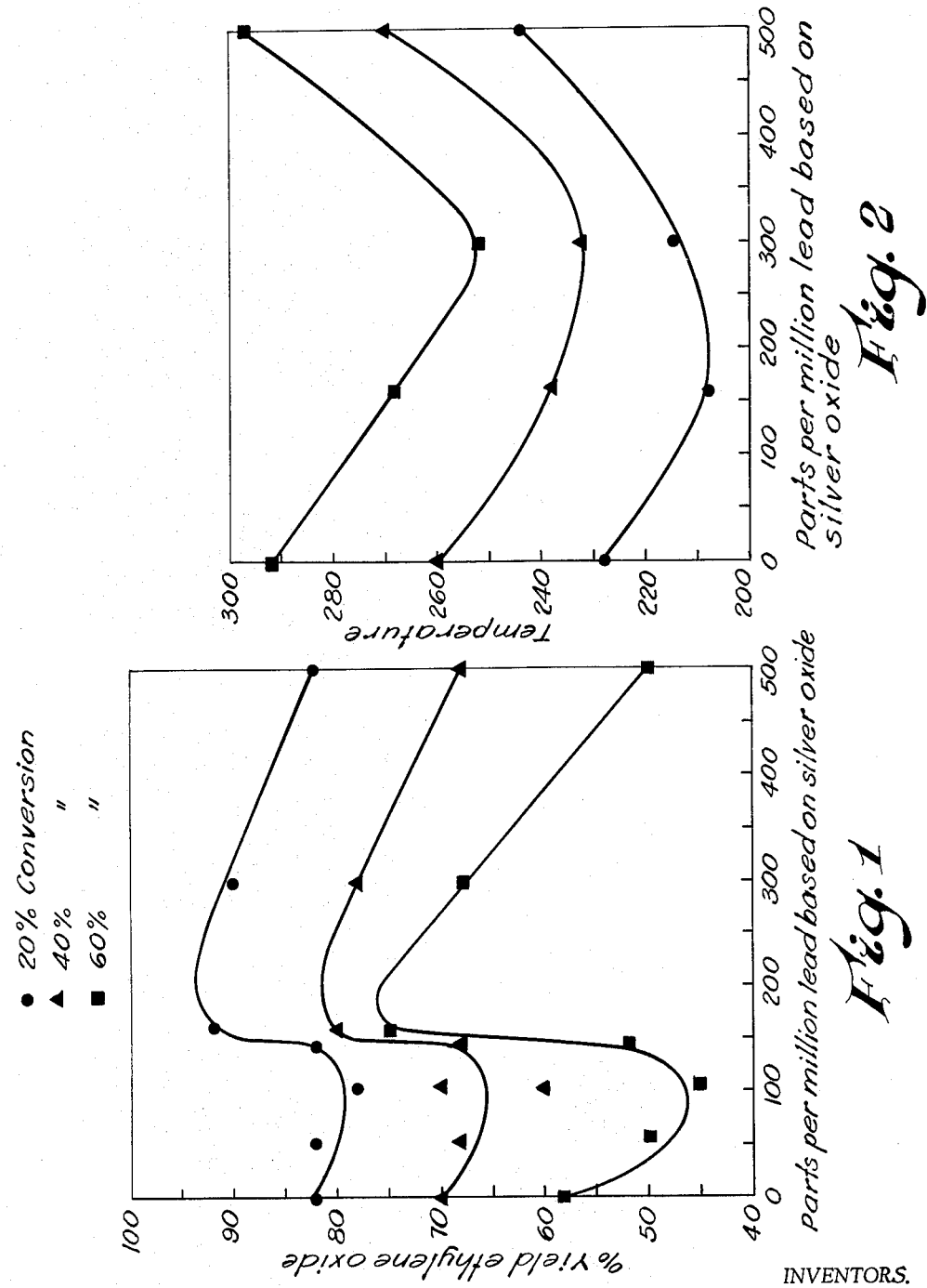

3,258,433
SUPPORTED SILVER CATALYST COMPOSITION PROMOTED WITH LEAD
Clarence E. Lambert and Thomas A. McIlheran, Jr., Lake Jackson, Tex., assignors to The Dow Chemical Company, Midland, Mich., a corporation of Delaware
Filed Mar. 22, 1963, Ser. No. 267,128
2 Claims. (Cl. 252—463)

The present invention relates to an improved method for making ethylene oxide. More particularly, the present invention concerns a process which employs a new catalyst whereby greater yields of ethylene oxide are obtained for a given conversion.

Ethylene has been oxidized to ethylene oxide for many years. The art is full of useful techniques and catalysts which have given satisfactory yields and conversions in the past. However, with the ever-increasing requirements for ethylene oxide, it becomes apparent that greater efficiencies in the utilization of ethylene will be required. The present invention provides one novel manner of achieving greater yields of ethylene oxide using existing plants without attendant expenditures of large sums of money for plant alteration or loss of money through down time during conversion to the present process.

The field of catalysis has been extensively explored and it is still a field in which little, if anything, can be predicted concerning an untried catalyst by observing the behavior of another catalyst and then attempting to extend the findings to related materials, either catalyst or reactant. Further, as it well known, feed stocks which are adjacent homologs or isomers of each other do not necessarily behave similarly in the presence of the same catalyst, let alone catalysts which might be said to be chemically or structurally similar.

The catalyst to which this invention is directed and which permits the accomplishment of the higher yields at conventional conversions is a supported silver catalyst containing 160 to 400 parts of lead per million parts of silver calculated as silver oxide. The calculation of the lead in the silver on the basis of silver oxide is merely for convenience since the preferred silver containing material employed in preparing the catalyst is silver oxide. The proportion of silver compound to support is varied so as to deposit a burden of between 0.5 and 20% by weight of silver, finished catalyst basis. The silver being conveniently impregnated on the carrier as silver oxide, contains 160 p.p.m. to about 400 p.p.m. lead calculated on silver oxide. The activity of such a catalyst is clearly shown in FIGURE 1, wherein the percent yield based on ethylene in the feed is plotted against parts lead per million parts of silver oxide at a conversion of 20, 40 and 60%.

The catalyst is conveniently prepared in the manner of U.S. Patent 2,920,052 by wetting a porous carrier with an aqueous glycol solution, adding the reducible silver compound which contains the desired amount of lead and the promoter, if any, with agitation to coat the wetted surface with the silver compound. The resulting wetted support is heated to remove the volatiles then the temperature is raised to about 200° C. and held thereat until the silver compound is reduced. The amount of silver can be varied from about 0.5 to about 20% by weight based on the total weight of support and silver. The preferred amount of silver is from about 3 to 8% by weight. The amount of lead employed, i.e., added to the silver, is from about 160 to about 400 parts of lead per million parts of silver oxide. Promoters of the known kind, such as the alkali metal and alkaline earth metal oxides and carbonates, the precious metal chlorides and the noble metal oxides, for example, sodium oxide, barium oxide, barium carbonate, gold chloride, stannous oxide, and the like, can be employed in proportions well known in the art.

The lead content of the catalyst is that lead associated with the silver only, not taking into account the trace amounts of lead in the carrier which, although maybe equal to several times the lead content of the silver, is inert under the conditions of the reaction.

The temperature of the reaction for converting ethylene to ethylene oxide in the presence of oxygen varies somewhat with the activity of the catalyst but generally good results are achieved at temperatures of from about 200° C. to 350° C.

The molar proportion of reactants in the feed can vary over a wide range, as fully taught in the art, but when employing the catalyst of the present invention, the reactants are employed generally in the range of about 1 to 1 to about 3 to 1, oxygen to ethylene, respectively, and preferably from 1 to 2 moles of oxygen per mole of ethylene. A diluent is employed in an amount ranging from about 85 to 98 mole percent of the feed stock. The diluent is an inert gas, preferably nitrogen, which may contain up to about 10 weight percent carbon dioxide. Other diluents well known in the art can also be employed.

The preferred contact time is from about 6 to about 8 seconds, although longer or shorter periods can be employed, as for example, as low as 4 seconds to as high as 12 seconds.

The preferred carrier for the silver oxide-lead catalyst is an inert porous, temperature stable material such as $Al_2O_3$ sold as alundum or Macroport, both being porous aluminum oxide, the latter, Macroport, being a very porous material. However, it is to be understood that other conventional catalyst supports or substrates such as zirconia, corundum, mullite and the like can be used. It has been found that the greater the porosity of the support the less silver is required to obtain good results.

The following examples illustrate the present invention but are not to be considered to be limiting.

*Example 1*

4960 grams of ¼ inch spherical alundum SA203 (containing 93 p.p.m. lead) was introduced into a V-shell blender and 693 ml. of a 25% by volume aqueous solution of ethylene glycol was added to the blender and agitated until the surface of the spheres was thoroughly wetted. Silver oxide, 388 grams, prepared so as to contain 160 p.p.m. lead and 32 grams of barium carbonate were added to the wetted spheres and agitation continued until the silver oxide was evenly distributed on the spheres' surface. The spheres were removed, placed in a glass container and heated to drive off the water and glycol. Heating was continued until the silver was reduced, the temperature necessary to accomplish this reduction was about 200° C. The resulting catalyst was about a 6.5% silver burden containing a lead content of 160 parts of lead per million parts of silver calculated as oxide.

Fifty cubic centimeters of the above prepared catalyst was placed in a glass cylinder 1 inch in diameter and 18 inches long, which cylinder was provided with a heater to maintain the reactor and contents at about 240° C. Twenty-five liters per hour of a feed having the following composition was fed to the reactor:

|  | Mole percent |
|---|---|
| Ethylene | 3.3 |
| Oxygen | 5.0 |
| $CO_2$ | 6.0 |
| Nitrogen | Balance |

The effluent from the reactor analyzed 32.8% ethylene oxide and 60% ethylene on a nitrogen free basis. This represented a 40% conversion of the ethylene in the feed and an 82% yield of ethylene oxide based on ethylene converted.

Example 2

A catalyst was prepared in the manner of Example 1 except that lead oxide was added to bring the lead content to 300 p.p.m. based on $Ag_2O$. The feed was identical to that described in Example 1, as were the reactor and procedure. The temperature of the reactor and contents was 235° C. The yield of ethylene oxide was 78% based on 40% conversion of ethylene in the feed.

Several batches of catalysts were prepared containing other amounts of lead. Runs were made in the same reactor employing the same feed and operating conditions to obtain the indicated conversion. The results of these runs are set forth below:

| Lead Content,[1] p.p.m. | Precent Yield Ethylene Oxide, Conversion at— | | |
|---|---|---|---|
| | 20% | 40% | 60% |
| 0 | 82 | 70 | 50 |
| 65 | 82 | 68 | 50 |
| 106 | 78 | 70 | 45 |
| 144 | 82 | 68 | 52 |
| 160 | 92 | 82 | 75 |
| 300 | 90 | 78 | 68 |
| 500 | 82 | 68 | 50 |

[1] In silver compound, carrier had 93 p.p.m. lead.

Example 3

A more porous catalyst support (5/16 inch diameter Macroport brand $Al_2O_3$ spheres made by Norton Company) was coated with a 3% by weight silver burden and 160 p.p.m. lead based on the silver oxide present, prepared in the same manner as Example 1.

The reactor was a 2-inch diameter tube 25 feet long with a 3/8-inch diameter thermowell extending the full length of the tube.

The results, using a feed composition of 5% ethylene, 7.5% oxygen and 6.0% carbon dioxide, the balance being nitrogen, are shown below:

TABLE I

| | |
|---|---|
| Flow SCFH[1] tube | 1536 |
| Temperature, ° C. | 282 |
| Percent conversion ethylene | 20.4 |
| Percent yield ethylene oxide | 86.4 |

[1] SCFH=Standard cubic feet per hour.

The limits are from about 160 to about 400 p.p.m. lead. It is apparent that the yields with 500 p.p.m. lead are about the same as with those catalysts containing no lead and that both these points are outside the limits of our invention.

FIGURE 2 shows graphically the effect of employing various amounts of lead on the temperature to obtain the equal conversion. The catalysts were those employed in the preceding examples and all feeds were constant. The data were plotted from continuous runs on the same catalyst varying only the reactor temperature. The graph shows conclusively that for a given conversion a lower temperature can be employed when from 160–400 p.p.m. of lead are employed.

We claim:

1. A silver catalyst supported on a porous carrier which catalyst is suitable for oxidizing olefins to olefin oxides characterized in that the silver contains from 160 to 400 parts of lead per million parts of silver calculated as silver oxide.

2. The catalyst of claim 1 wherein the silver is impregnated on a porous alundum ($Al_2O_3$) carrier.

References Cited by the Examiner

UNITED STATES PATENTS

| | | | |
|---|---|---|---|
| 1,998,878 | 4/1935 | Lefort | 260—348.5 |
| 2,005,645 | 6/1935 | Bond et al. | 252—476 XR |
| 2,307,421 | 1/1943 | Overhoff | 252—476 |
| 2,458,266 | 1/1949 | Heider et al. | 252—476 XR |
| 2,752,362 | 6/1956 | Landau | 260—348.5 |
| 2,766,261 | 10/1956 | Landau | 260—348.5 |
| 2,805,207 | 9/1957 | Metzger | 252—476 |
| 2,920,052 | 1/1960 | Martin | 252—463 |

FOREIGN PATENTS 402,438 12/1933 Great Britain.

OTHER REFERENCES

Mellor, J. W.: A Comprehensive Treatise on Inorganic and Theoretical Chemistry, London, Longmans, Green and Co., 1923, chapter 22, p. 314.

OSCAR R. VERTIZ, *Primary Examiner.*

NICHOLAS S. RIZZO, MAURICE A. BRINDISI,
*Examiners.*

J. P. FRIEDENSON, G. OZAKI, *Assistant Examiners.*